June 14, 1960 T. D. JORGENSEN 2,940,197
SLIDE CHANGING ATTACHMENT
Filed Aug. 19, 1957 2 Sheets-Sheet 1
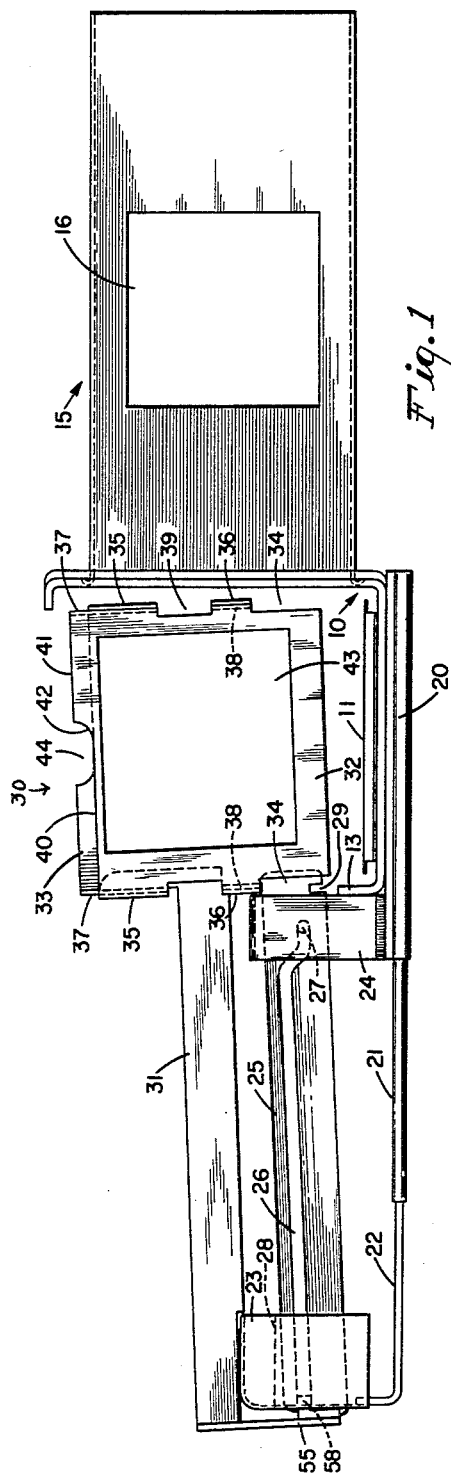
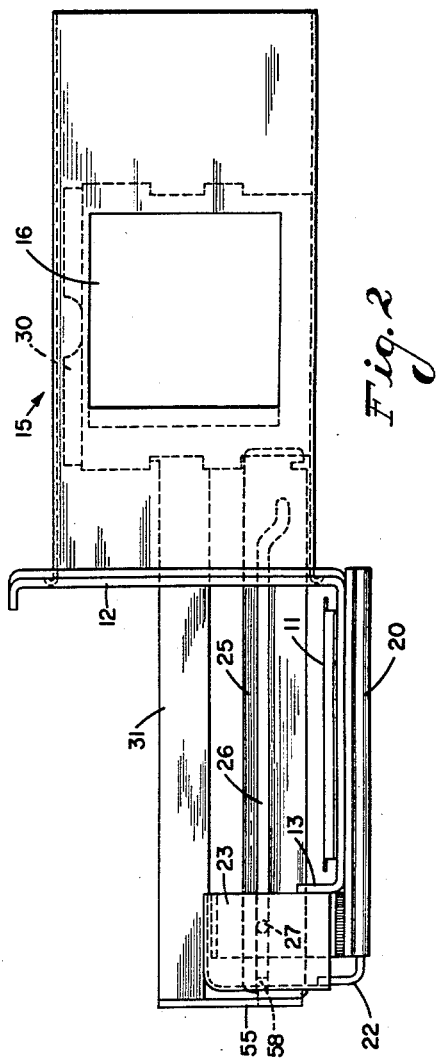
INVENTOR.
THOMAS D. JORGENSEN
BY
ATTORNEY

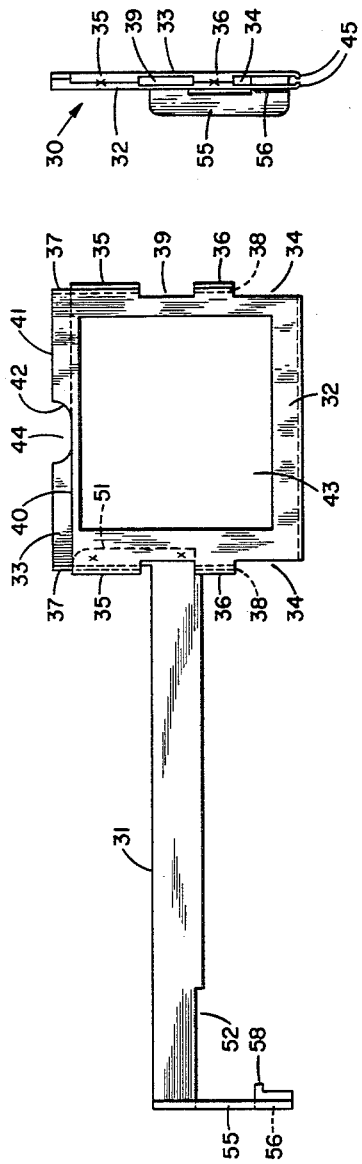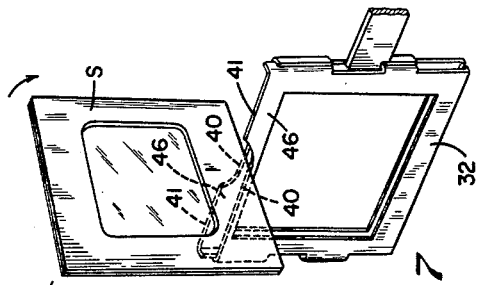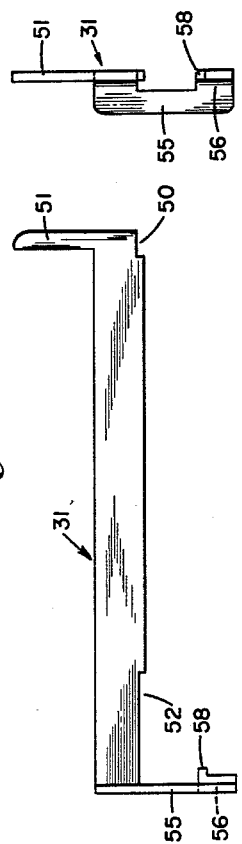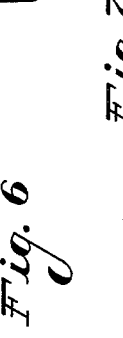

United States Patent Office 2,940,197
Patented June 14, 1960

2,940,197

SLIDE CHANGING ATTACHMENT

Thomas D. Jorgensen, Fairport, N.Y., assignor to Graflex, Inc., Rochester, N.Y., a corporation of Delaware Filed Aug. 19, 1957, Ser. No. 678,835

5 Claims. (Cl. 40—79)

The present invention relates generally to means for exhibiting transparent slides, and more particularly to an accessory for a slide changing apparatus for projectors, such as disclosed in the U.S. Patent of Carl H. Wiklund No. 2,711,602, granted June 28, 1955.

In the Wiklund patent there is disclosed a slide changing mechanism which permits moving slides from a magazine into alinement with the optical system of a projector, and for thereafter returning the slides to the magazine, and which includes, also, means for automatically advancing the magazine each time an exhibited slide is returned to the magazine.

Frequently it is desirable to view one slide at a time for the purpose of editing, to determine whether or not the slide is suitable for inclusion in a permanent collection, to determine what the relation of a given slide to the other slides may be so as to determine the order in which the slides should be put in a magazine, etc.

A primary object of the present invention is to provide a removable attachment for a slide changer such as disclosed in the Wiklund patent, which will permit using the transfer mechanism of this slide changer to move a single slide at a time into the projector and subsequently withdraw it therefrom, without having to put the slide into a magazine.

Another object of the invention is to provide an attachment of the character described which will permit easy and quick positioning of a slide in the attachment, and easy and quick removal of the slide therefrom.

A further object of the invention is to provide a device of a character described which is of relatively simple and relatively inexpensive construction.

Other objects of the invention will be apparent hereinafter from the specification and from the recital of the appended claims when taken in conjunction with the accompanying drawings.

In the drawings:

Fig. 1 is a front elevation showing the transfer member, magazine support, and slide viewing housing of the slide changer of the Wiklund patent, with an accessory or attachment made according to one embodiment of the present invention mounted on the transfer member, the transfer member being shown in fully withdrawn position;

Fig. 2 is a similar view, but showing the transfer member moved laterally inwardly to move the slide holder of the attachment into registry with the slide viewing housing of the slide changer;

Fig. 3 is a side elevation of the attachment;

Fig. 4 is an end view thereof;

Fig. 5 is a side view of the handle of the attachment;

Fig. 6 is an end view of this handle; and

Fig. 7 is a perspective view showing how the structure of the holder of the present invention facilitates insertion into the holder of a slide that is to be viewed.

Referring now to the drawings by numerals of reference, 10 denotes the magazine support of the known slide changer. It comprises a base portion 11, on which the magazine is mounted and guided, a side wall portion 12 at one side of the base, and an upturned flange portion 13 at the opposite side of the base.

The projection housing is denoted at 15. It extends laterally from the side wall 12. In use, the housing 15 fits into a slot in a projector (not shown) with the aperture 16 in the housing aligned with the lens and light source of the projector. When a slide, which is to be viewed, is moved into alignment with the aperture 16, then, it is aligned with the optical system of the projector, and the picture on the slide will be thrown onto the screen (not shown).

Secured beneath the base 11 of the magazine holder 10 is a channel member 20, in which is mounted a sliding sleeve 21, that in turn receives a sliding member 22. Secured to the top of the channel member 20 is a guide member 24 which projects upwardly.

Slidable in the guide member 24 is a transfer member 25. This transfer member is recessed in its undersurface, as denoted at 29, to engage over a complementary portion of a slide holder, as described in Patent No. 2,711,602, for moving the slide holder into or out of the housing 15. The transfer member is also formed with a cam slot 26 which co-operates with a stationary stud 27 that is carried by the guide member 24. As the transfer member is moved laterally inwardly the cam slot 26 traveling along the stationary stud 27 causes the transfer member to be moved downwardly. As the transfer member is withdrawn, the reverse action occurs and the transfer member is lifted so that it will be disengaged from the slide holder of the magazine.

The slide member 22 is formed with a handle 23; and the transfer member extends into an opening 28 in the handle 23, which is large enough to permit up and down rocking movement of the transfer member.

All of the preceding is the conventional construction and is disclosed in the Wiklund patent.

To enable single slides to be viewed, I have provided a holder which is adapted to be mounted on the transfer member of the Wiklund or similar apparatus and to be supported therefrom.

This holder comprises a frame 30 and a handle 31. The frame comprises two generally rectangular shaped frame members 32 and 33, which are preferably made identical with one another. Each has an upper and a lower tab or flange, 35 and 36, respectively, at one side that are spaced vertically from one another; and each has an upper and a lower tab or flange, 37 and 38, respectively, at the opposite side that are spaced vertically from one another. The lower tabs or flanges 36 and 38 of the two frame members are identically placed and of equal height. The upper tabs or flanges 37 of the two frame members are identically placed; and so are the upper tabs or flanges 35 of the two frame members. The upper tabs or flanges 37 are, however, of greater height than the upper tabs or flanges 35. The two frame members are internested so that the tab or flange 35 of one frame member overlaps laterally and is contiguous to the tab or flange 37 of the other frame member, and the tab or flange 36 of one frame member overlaps laterally and is contiguous to the tab or flange 38 of the other frame member. The tabs or flanges are of such length from front to rear that they space the frame members apart sufficiently to receive a slide between them. The contiguous tabs or flanges are spot welded or soldered along their overlapping portions, as indicated by the x marks in Fig. 4, so as to secure the holder together.

Each part of the holder is of different height adjacent opposite lateral sides, the top edge of each frame member consisting of a straight portion 40, of a straight portion 41, disposed vertically above straight portion 40 and of a curved portion 42 connecting the edge portions 40 and 41. The straight portion 40 of the top edge of each frame member is longer than the straight portion 41 thereof.

Since the two parts of the holder are internested and reversed with reference to one another, the top edge construction provides a recess 44 in the holder which is bounded at opposite sides by the curved portions 42 of the top edges of the two frame members. This recess permits readily gripping a slide to remove it from the holder. This construction also provides a ready means for rotating a slide to position it for insertion in the holder. This latter feature is illustrated in Fig. 7. As will be seen from this figure, to position a slide S in the holder, the slide is first placed across the portions 40 of the top edges of the frame members in the pocket portion 44 of the holder. Then, the slide is rotated about a vertical axis until the slide contacts the upstanding portions or flanges 46 of the holder; then the slide is inserted in the holder by pushing it, or letting it drop, downwardly. There is no need to fumble around trying to get the slide aligned with the pocket in the holder. By placing the slide crosswise of the holder, and rotating it on its vertical axis it automatically comes into alignment with the pocket in the holder.

The lower edges of the two parts of the holder have inturned portions 45 (Fig. 4) which may abut one another or be slightly separated. They serve to hold a slide from dropping out of the holder.

The frame members have registering rectangular openings 43 through which the picture on the slide, that is to be viewed, is exposed.

The handle 31 is a little longer than the transfer member 25 to lap over the transfer member at one end and to permit the transfer member to engage in the slide holder at the other end. The handle is cut away at one end, as denoted at 50 (Fig. 5), for insertion into the holder 30 through the space 39 between the associated tabs 36 and 38 and the associated tabs 35 and 37 at one side of the holder. The handle 31 has an upwardly projecting lug 51 which is inserted through this space and which engages inside and abuts against the tab 37 at this end of the holder. This lug 51 is welded or soldered to the holder as denoted by the x marks (Fig. 3). The handle has a recess 52 on its underside adjacent its other end which fits over the handle 23 of the transfer slide 22; and at this other end the handle also has a laterally projecting portion 55 which is formed at its bottom with the tab 56 that engages against the outer end of the transfer member, and that has a lug 58 integral with it. The lug 58 is adapted to engage in the slot 26 of the transfer member 25. The portion 55 of the handle acts to stabilize the holder 30 laterally while the lug 58 prevents the handle and the holder from lifting off the transfer member. Further to stabilize the holder laterally, the inner end of the transfer member 25 engages in the slot or space 34 formed at one side of the holder between the two frame members of the holder below the associated tabs 36 and 38.

In use, a slide which is to be viewed, is dropped into the holder 30. Then the operator presses against the downwardly depending portion 55 of the handle 31 to force the transfer member 25, slide 22, and sleeve 21 inwardly. As the transfer member moves inwardly the cam slot 26, traveling over the stationary stud 27, causes the inner end of the transfer member to move downwardly, forcing the holder 30 downwardly also, to bring the holder 30, into alignment with the opening in the side wall 12 of the magazine support. As the transfer member 25 is pressed further to the right (Fig. 1), the holder 30 with the slide therein is moved through the opening in the side wall 12 of the magazine support into the housing 15 so that the slide is brought into registry with the aperture 16 in the housing, thereby bringing the slide into alignment with the optical system of the projector. Hence the picture on the slide will be thrown on the screen to be viewed.

Fig. 2 shows the holder 30 in viewing position. On reverse movement of the transverse member, the holder is withdrawn and lifted so that the slide can readily be removed from the holder.

While a particular embodiment of the invention has been described, it will be understood that the invention is capable of further modification and this application is intended to cover any variations, uses, or adaptations of the invention following, in general, the principles of the invention, and including such departures from the present disclosure as come within known or customary practice in the art to which the invention pertains, and may be applied to the essential features hereinbefore set forth and as fall within the scope of the invention or the limits of the appended claims.

Having thus described my invention, what I claim is:

1. A removable attachment for a slide changer for moving slides between a slide magazine and a slide projector, said slide changer comprising a reciprocable transfer member, said attachment comprising a frame for holding a single slide, and an elongate handle for reciprocating said transfer member and attachment together, said frame comprising two identical, internesting frame members having registering apertures through which the picture on the slide may be exposed, each frame member having two tabs spaced vertically from one another along each of its opposite side edges which extend at right angles to the main portion of the frame member, the tabs of one frame member abutting against the opposed inside surface of the other frame member to space the frame members from one another so as to receive the slide, which is to be projected, therebetween, and the two tabs along one side edge of one frame member being in vertical registry, respectively, with the two tabs along the corresponding side edge of the other frame member, respectively; two of the registering tabs being spaced vertically from the bottoms of the frame members to provide a slot between the two frame members along one side thereof, and the two pairs of registering tabs at said one side of the two frame members being spaced vertically from one another to provide a second slot between the two frame members along said one side, said transfer member and said handle extending through the two slots, respectively, said handle having a portion which engages against the outside of said frame members to move said frame members in one direction when said handle is moved longitudinally in one direction, and the portion of said handle which extends through one of said slots engaging inside the frame members to retract said frame members when said handle is moved longitudinally in the opposite direction to provide lateral stability for said attachment.

2. A removable attachment for a slide changer for moving slides between a slide magazine and a slide projector, said suide changer comprising a reciprocable transfer member, and said attachment comprising a frame for holding a single slide, and an elongate handle, said handle being rigidly secured to said frame at one end and having a laterally offset portion at its opposite end adapted to abut against the outer end of said transfer member to connect said transfer member and attachment for movement together, and said frame having a slot therein into which the inner end of said transfer member extends to provide lateral stability for said attachment.

3. A removable attachment for a slide changer for moving slides between a slide magazine and a slide projector, said slide changer comprising a reciprocable transfer member, and said attachment comprising a frame for holding a single slide, and an elongate handle, said frame comprising two identical, internesting frame members, each frame member having two vertically spaced tabs along each side edge, the tabs on each frame member being bent toward the other frame member to abut against the opposed inside wall of the other frame member to hold the frame members in spaced relation to receive a slide, which is to be projected, therebetween, said handle having a portion at its inner end extending into said frame through the space between the two tabs at one side of the frame and said inner end of said handle being rigidly secured to said frame, said frame having a slot in said one side of said frame below said space and into which the inner end of the transfer member may extend, and said handle having a laterally offset portion at its outer end adapted to abut against the outer end of said transfer member to connect said transfer member and attachment for movement together.

4. An attachment for a slide changer as claimed in claim 3 in which each frame member has the part of its top edge, which is adjacent one side of the frame member, disposed vertically above the part of its top edge which is adjacent the other side of the frame member, the two top edge portions of each frame member being connected by a curved edge portion so that when the frame members are assembled in mirror relationship there is a space provided through which a person can grasp the slide in the frame to remove the slide from the frame.

5. An attachment for a slide changer as claimed in claim 3 in which means is also provided on the handle adapted to interconnect the handle with the transfer member to prevent lifting movement of the holder relative to the transfer member as the transfer member is reciprocated.

References Cited in the file of this patent

UNITED STATES PATENTS

| | | |
|---|---|---|
| 2,315,914 | Wengel | Apr. 6, 1943 |
| 2,468,566 | Marcus et al. | Apr. 26, 1949 |
| 2,711,602 | Wiklund | June 28, 1955 |